United States Patent [19]
Iwasaki

[11] 3,747,939
[45] July 24, 1973

[54] TAPE CARTRIDGE EXCHANGING DEVICE

[75] Inventor: Tadahisa Iwasaki, Tokyo, Japan

[73] Assignee: Pioneer Electronic Corporation, Tokyo, Japan

[22] Filed: Nov. 10, 1970

[21] Appl. No.: 88,463

[30] Foreign Application Priority Data

Nov. 11, 1969 Japan .......................... 44/106410

[52] U.S. Cl. .............................................. 274/4 F
[51] Int. Cl. .............................................. G11b 5/00
[58] Field of Search ..................... 274/4 B, 4 C, 4 F, 274/11 B, 11 C; 242/55.19 A; 179/100.2 Z; 226/110

[56] References Cited

UNITED STATES PATENTS 3,217,997 11/1965 Lundgren et al. ........... 242/55.19 A

FOREIGN PATENTS OR APPLICATIONS 18,945 8/1968 Japan ................................ 274/4 B

*Primary Examiner*—Harry N. Haroian
*Attorney*—Sughrue, Rothwell, Mion, Zinn and Macpeak

[57] ABSTRACT

A tape cartridge exchanging device to be utilized on magnetic tape recorders for the purpose of exchanging two tape cartridges inserted into the magnetic tape recorder. The cartridge exchanging device has a forked lever that is activated by a plunger for simultaneously depressing and releasing the respective pinch rollers on a pair of tape cartridges. Spring connections bias the various levers to a neutral position.

5 Claims, 6 Drawing Figures

TAPE CARTRIDGE EXCHANGING DEVICE

BACKGROUND OF THE INVENTION

1. Field of the Invention

This invention relates to a magnetic tape recorder or reproducer that utilizes endless tape cartridges inserted into two cartridge receptive ducts which can be sequentially activated to provide continuous playing.

2. Description of the Prior Art

Previously, magnetic tape recorders have utilized two types of cartridge exchanging devices for exchanging two separate tape cartridges inserted thereinto. One of these devices was generally constructed so that the respective cartridges were alternatively exchanged by moving them back and forth so as to depress or release their respective pinch rollers onto a capstan. The other exchange device was constructed so that the respective pinch rollers were depressed or released from the capstan by separately operating two plungers. Both of these tape cartridge devices require a large number of mechanical parts with a corresponding large installment space on the magnetic tape recorder. Both of these requirements are detrimental to use of the magnetic tape recorder in a highly competitive market.

SUMMARY OF THE INVENTION

The present invention is designed to provide a tape cartridge exchanging device which has two cartridges inserted into the cartridge exchanging device for both an easy and positive exchange of the cartridges during the operation or playing time of a magnetic tape recorder or reproducer. This is accomplished by providing, according to the present invention, a tape cartridge exchange device which has only one plunger and a relatively simple mechanical mechanism for easily accomplishing the operative exchange of the tape cartridges.

IN THE DRAWINGS

The other objects, features and advantages of the present invention will be further described taken in conjunction with the accompanying drawings in which.

DESCRIPTION OF THE PREFERRED EMBODIMENT

Figure 1:
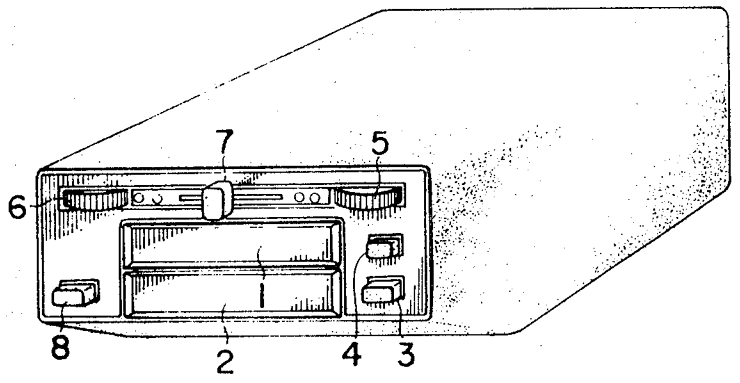
FIG. 1 is a perspective view of a magnetic tape recorder or reproducer constructed according to the present invention.

With reference to the above drawings, and particularly FIG. 1, a magnetic tape recorder or reproducer constructed according to the present invention is disclosed. Reference numerals 1 and 2 show the insert inlets or ducts for the tape cartridge. Reference numerals 3 through 8 disclose the operating buttons of the magnetic tape recorder. Button 3 illustrates a transfer switch for alternating the playing of either the upper or lower tape cartridge. Switch 4 is a power switch while switches 5 and 6, respectively, refer to a volume and quality control knob. Reference numerals 7 and 8, respectively, refer to a balance control knob and a channel transfer switch of the recorded tracks of the tape.

Figure 5:
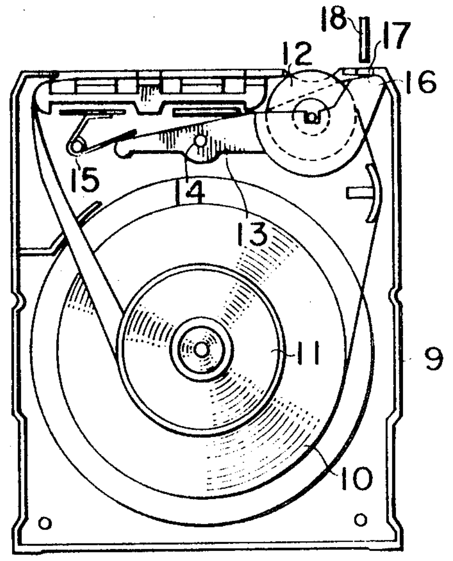
FIG. 5 is a plan view of the endless tape cartridge from which a cover is removed and the structure is adapted for the present invention.
Figure 6:
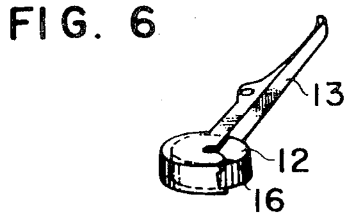
FIG. 6 is a pinch roller holder disposed within the endless tape cartridge.

Referring to FIG. 5, a tape cartridge 9 carries a magnetic tape 10 which is endlessly wound on a reel 11. A pinch roller 12 is supported on a pinch roller holder 13 which is in turn supported by a shaft 14 having one end spring biased by spring 15. The spring bias is designed to force the pinch roller 12 at the other end of the spring mechanism into an outward position that makes it readily accessible for driving the tape. When the tape cartridge is not inserted into the tape recorder or reproducer, the edge 16 of the pinch roller holder 13 contacts the inner wall of the cartridge. The cartridge 9 has a cutout portion 17 of the wall adjacent to the opening for the pinch roller through which the magnetic head enters to contact with the edge 16.

Figure 2:
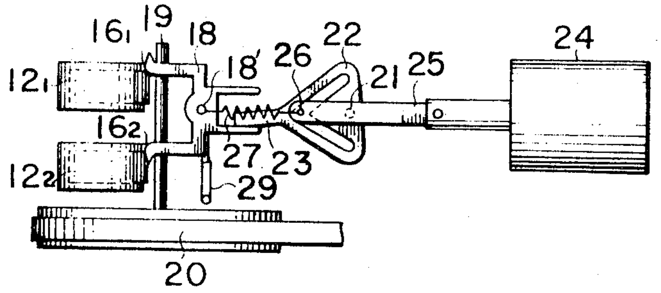
FIG. 2 is a side view of a main configuration of the tape cartridge exchanging device when it is in a neutral position.
Figure 3:
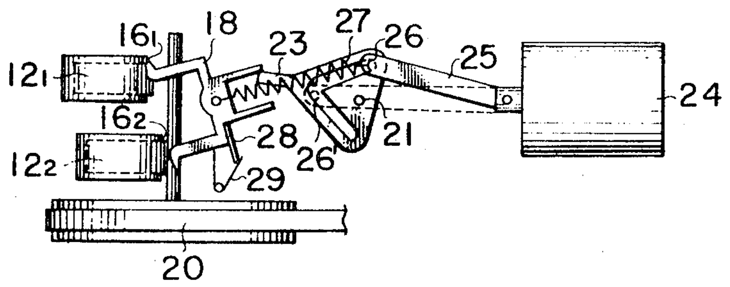
FIG. 3 is a side view of the present invention showing the pinch roller of the upper tape cartridge being depressed onto the capstan.

Referring to FIG. 2, the tape exchange device of the present invention is disclosed in a neutral position where both operating ends of a transfer lever 18 pivotally supported at 18' contact the respective edges $16_1$ and $16_2$ of the pinch roller holders for holding the pinch rollers $12_1$ and $12_2$ of both the endless tape cartridges $9_1$ and $9_2$. The two tape cartridges $9_1$ and $9_2$ are inserted respectively into the upper and lower openings as disclosed in FIG. 1 to restrict the pinch rollers $12_1$ and $12_2$ in a fixed position so that the capstan 19 is capable of contacting them. The capstan 19 is attached to a flywheel 20 which carries a belt for transmitting a rotary force. Two projections are provided at the right side as disclosed in the drawings of the transfer lever 18. A deformed plate lever 22 having a projecting end 23 is interleaved between the upper and lower projections of the transfer lever 18 and is pivotally supported at a fulcrum point 21. The deformed plate lever 22 is so supported as to have a friction resistance at the fulcrum point 21. The lever 22 has an angular hole running adjacent the edge of the triangular deformed plate lever 22. A plunger 24 carries a projecting bar 25 with a pin 26 connecting the projecting plunger bar 25 and the deformed plate lever 22. The pin passes through the angular hole to permit a camming action to take place between the pin 26 and the sides of the angular hole. The end of the projecting bar 25 and fulcrum 18' of the forked lever is connected by a spring 27. The lower projection of the transfer lever or forked lever 18 contacts the end 23 of the deformed plate lever 22 as disclosed in FIG. 2. When the plunger 24 operates in an angular movement the pin 26 is moved in relationship to the deformed plate lever 22. If the pin 26 is moved upwardly and rightwardly along the upper portion of the angular hole from the bent portion by the plunger 24, it rotates the deformed lever plate 22 clockwise. Likewise if the deformed lever 22 rotates clockwise, the left end 23 thereof rises with the result that it contacts and raises the upper projections of the transfer lever or forked lever 18. The transfer lever 18 is rotated counterclockwise around the fulcrum 18' causing the lower operating end of the transfer lever 18 to release the edge $16_2$ of the pinch roller holder so that the pinch roller $12_2$ advances to be pressed onto the capstan 19 and to assume an operative position in the tape recorder. Simultaneously, the upper operating end of the transfer lever 18 presses the edge $16_1$ of the upper pinch roller holder $13_1$ so that the pinch roller $12_1$ is moved away from the capstan 19. The bar 28 fixed to the lower end of the transfer lever 18 is interleaved between the U-shaped fixed spring or springs 29 as disclosed in FIG. 3. FIG. 3 shows the operative position of the lower tape cartridge where the plunger 24 has operated so that the lower pinch roller $12_2$ is pressed onto the capstan 19. Once the plunger 24 has finished its operation, the bar 25 is drawn by the spring 27 to return to a neutral state as shown by the dotted line so that the pin 26 fixed at the left end of the projecting bar 25 becomes stationary at the lower side 26' of the angular cavity or hole in the deformed plate lever 22.

Figure 4:
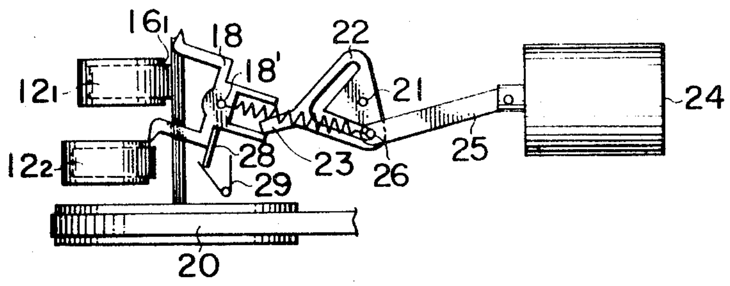
FIG. 4 is a side view of the present invention showing the pinch roller of the lower tape cartridge being depressed onto the capstan.

Referring to FIG. 4, the tape exchange device is shown with the deformed plate lever 22 rotating counterclockwise so that the transfer lever 18 rotates clockwise with the result that the upper pinch roller is pressed onto the capstan 19. If the power switch 4 is cut off so that the magnetic tape recorder or reproducer is stopped, the pinch roller holders $16_1$ and $16_2$ contact the transfer lever 18 as shown in FIG. 2 so that the transfer lever 18 resumes the neutral position. But even in the neutral position there exists a friction resistance between the deformed plate lever 22 and the fulcrum point 21. Thus, if the magnetic tape recorder is shut off so the power ceases leaving the tape exchange device in the position shown in FIG. 4, the end 23 of the deformed plate lever 22 contacts the lever projection of the transfer lever 18 as shown in FIG. 2, and as a result once the power is restored, the deformed plate lever 22 can positively rotate clockwise.

It should be understood from the foregoing description that in accordance with the present invention, the upper and lower tape cartridges are transferred or exchanged to either side of the capstan 19 of the pinch roller positively by a simple device that utilizes only a single plunger. This permits the tape exchange device to be effectively reduced in size, and further prevents the deformation of the pinch rollers since the transfer device does not contact directly the pinch roller While the above illustrate the preferred embodiment of the present invention, it should be understood by those in the art that various modifications are possible within the intent of the present invention. Accordingly, it should be understood that the above specification is illustrative only, and that the extent of the present invention should be determined from the following claims.

I claim:

1. A cartridge exchange device for exchanging two cartridges in a magnetic recorder, each cartridge having a movably mounted pinch roller therein, and said recorder including a driving capstan and a magnetic pickup head, said device comprising:

a. support means for supporting the cartridges;

b. engaging means for engaging one of said pinch rollers and said driving capstan while disengaging the other pinch roller and the driving capstan, and said engaging means including:

a first pivotal support means positioned adjacent said supporting means;

a forked lever positioned on said first pivotal support means having a first pair of projections on the side of said first pivotal support means towards said supporting means and a second pair of projections on the other side of said first pivotal support means;

a second pivotal support means; and a plate lever having an angular recess, said second pivotal support means engaging said plate lever in said angular recess wherein said plate lever is operatively positioned between said second pair of projects; and c. actuating means, operatively coupled to said engaging means, for moving said forked lever about said first pivotal support means such that pivotal movement in a first direction causes said first pair of projections to force the engagement of one of said pinch rollers and said driving capstan and pivotal movement in the other direction causes said first pair of projections to force engagement of the other of said pinch rollers and said driving capstan.

2. The device of claim 1 wherein the actuating means includes a bar having a pin operatively positioned in the angular recess of the plate lever for exerting a rotational movement to the plate lever.

3. The device of claim 2 further including a first and second spring means for resiliently holding, respectively, the forked lever and the bar of the plunger means in a fixed position.

4. The device of claim 3 where the first spring means is a U-shaped spring and the forked lever further includes a projection operatively extending between the U-shaped spring.

5. The device of claim 3 where the second spring means is connected between the bar of the plunger and the forked lever.

* * * * *